July 28, 1953      E. F. RUBY ET AL      2,646,624
UNIVERSAL GAUGING AND SCRIBING MEANS
Filed April 17, 1952      2 Sheets-Sheet 1
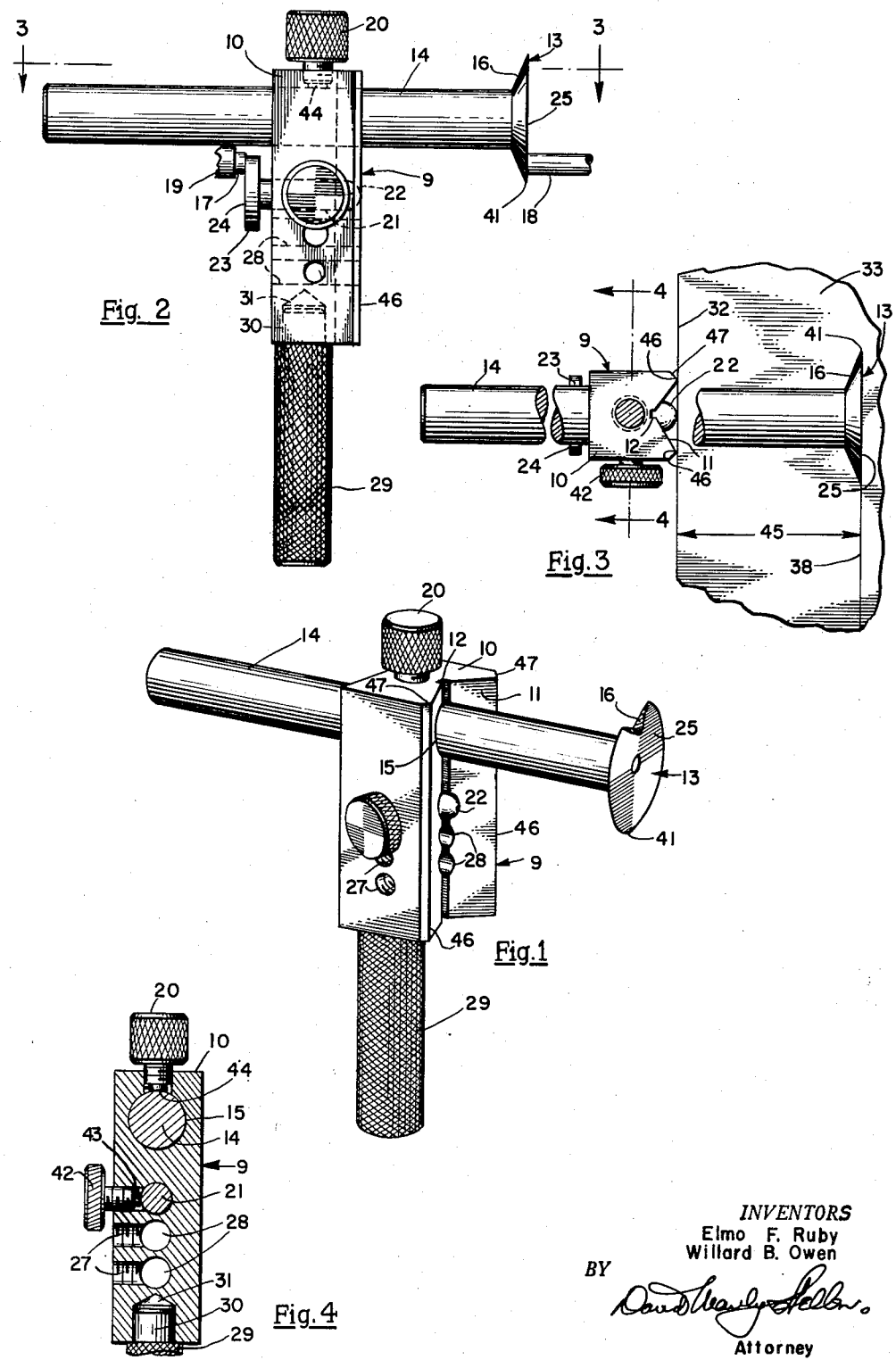
INVENTORS
Elmo F. Ruby
Willard B. Owen
BY
Attorney July 28, 1953 E. F. RUBY ET AL 2,646,624
UNIVERSAL GAUGING AND SCRIBING MEANS
Filed April 17, 1952 2 Sheets-Sheet 2

INVENTORS
Elmo F. Ruby
Willard B. Owen
BY
Attorney

Patented July 28, 1953

2,646,624

UNITED STATES PATENT OFFICE 2,646,624

UNIVERSAL GAUGING AND SCRIBING MEANS

Elmo F. Ruby and Willard B. Owen, Cicero, Ill.

Application April 17, 1952, Serial No. 282,876

8 Claims. (Cl. 33—42)

Our invention relates to micrometric gauging and scribing means.

An important object of our invention is to provide an instrument of the aforementioned character, which is equipped with adjustable gauging means to be measured by accurately calibrated instruments such as micrometers or vernier calipers, in other words, an instrument which may be used for scribing lines when doing layout work such as is usually required in mechanical and machine operations.

Another object of our invention is to provide an instrument of the aforementioned character which may be used to scribe lines about a circular area or end of a cylindrical unit.

A still further object of our invention is to provide an instrument of the aforementioned character, which may be used to scribe lines parallel to an edge of a polygonal area having a number of sides.

A still further object of our invention is to provide an instrument of the aforementioned character which may be used for scribing work lines on a coronal area.

A still further object of our invention is to provide an instrumentality of the aforementioned character, consisting of a V-block structure provided with a gauging element, and a scriber element adjustably positioned within a certain range of dimensions, so that the same may be set to micrometric accuracy by means of micrometer or vernier calipers.

A still further object of our invention is to provide an instrument of the aforementioned character which is practical in its construction and operation, simple in its elemental arrangement, to the extent that the same may be manufactured economically in quantity production.

Other objects, and ancillary advantages inherent in our invention, will become apparent from an examination of the accompanying drawings, bearing further elucidation in the ensuing description, where like symbols are used to designate like parts, and in which:

Fig. 1 is a perspective view of the instrument comprising our invention.

Fig. 2 is a front elevational view of our invention.

Fig. 3 is a fragmentary view looking in the direction of arrows 3—3 on Fig. 2, indicating how the instrument is set to scribe a line parallel to an edge.

Fig. 4 is a cross-sectional view taken, substantially, on the lines 4—4 of Fig. 3.

Figure 5:
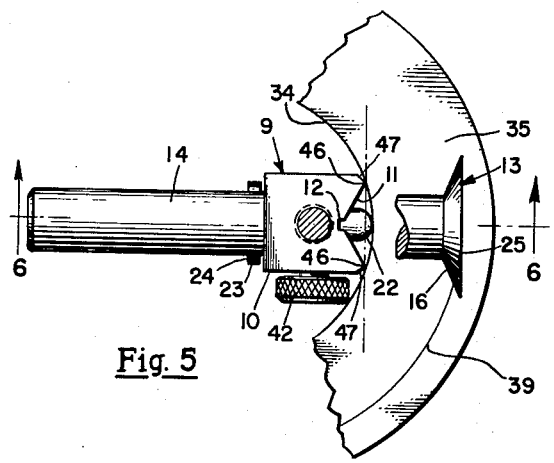
Fig. 5 is a view showing how the instrument is utilized to scribe a line on a coronal area.
Figure 8:
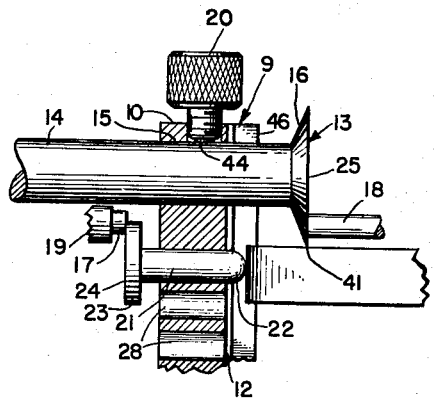
Fig. 8 is a fragmentary cross-sectional view taken, substantially, on the lines 8—8 of Fig. 7.

Referring to the various views, our invention is generally designated 9, and consists of a block support 10, provided with an angular or V locating formation 11 on one of its faces, terminating centrally in the relief slotted portion 12 to facilitate machining the V-formation 11.

A bore 15 is provided in which the scribing instrument 14 is slidably and adjustably fitted. The said scribing instrument 14 is provided with a scribing element 13, which is of frusto-conical formation as indicated at 16, in order that the same may be hardened and ground from time to time when the scribing edge 41 should become dull.

A binding screw 20 serves to position the scribing element 13 in the proper position desired. The gauging element 21 is provided with a gauging head portion 23 and a ground surface 24, which will provide the other gauging point in addition to the surface 25 for setting the instrument accurately by virtue of micrometer calipers 19; the same being a standard instrument provided with the ratchet stop 26, so that no undue pressure will be used to influence the micrometer setting erroneously.

The gauging element 21 is fitted within the hole 22, or the additional holes 28 indicated, whenever it is found more convenient to do so. Each hole is provided with a tapped hole perpendicular thereto, and designated 27 for the clamp screw 42, which is used to hold the gauging element 21 in its proper position. Likewise, the scribing element 14 is held in place by the clamp screw 20 which is suitably knurled so that it may be handled conveniently by the fingers; the screw 42 being provided with a soft tip 43, so as not to mar the element 21, whereas the screw 20 being also provided with a soft tip 44 so as not to mar the scribing element 14.

In Fig. 2 it will be noted that the anvil 17 of the micrometer 19 and its complementary measuring rod 18 are set in order to embrace the dimension that it is desired to scribe, for example, as seen in Fig. 3. The dimension 45, for example, being an inch and a half, and the length of the element 21 from its head 24 to its hemispherical tip 22 (which may also be of conical formation) is automatically added on to the dimension 45, hence setting the micrometer as illustrated in Fig. 2.

The standard or constant dimension from the face 24 to the tip of the hemispherical portion 22, for example, let us say, is one inch; therefore, the micrometer 19 would be set to one inch plus whatever dimension is intended for the line 38 to be scribed from the edge 32 of the workpiece 33 and thus, if that should be an inch and a half, then the micrometer caliper would be set to 2.500'' in order to preserve extreme accuracy between the surface 25 and the surface 24. Then the scribing element 14 is clamped in place by the clamp screw 20 and the V-formation 11 is so positioned that its edges 46 are tangent or in intimate contact with the edge 32 of the workpiece 33, thus scribing a line 38 parallel to the edge 32, demarcating a distance exactly 1.500''.

The instrument is conveniently manipulated and handled when scribing the line 38 by holding the knurled handle 29, which is of cylindrical formation provided with a reduced end 30, fitted into the bore 31 in the block 10. It is to be noted that the V-formation 11 is cut away or chamfered at 47, so as to provide lines of contact 46 in tangential relationship with a surface on which scribing is to be done, so that, as viewed in Figs. 5 and 6, that the instrument is set for scribing a line 39 on the workpiece 35, a certain distance from the hole or bore 34, the setting being performed in the same manner as heretofore mentioned, so that a coronal area 35, may also be scribed, and the line tangential contact of the section or portion 46 thus will not militate against the circumference 34.

Figure 6:
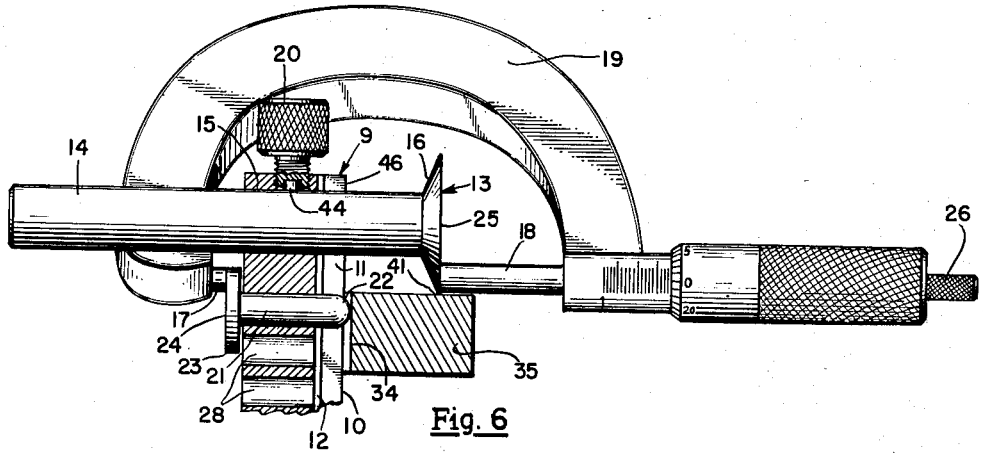
Fig. 6 is a longitudinal cross-sectional view taken, substantially, on the line 6—6 of Fig. 5.
Figure 7:
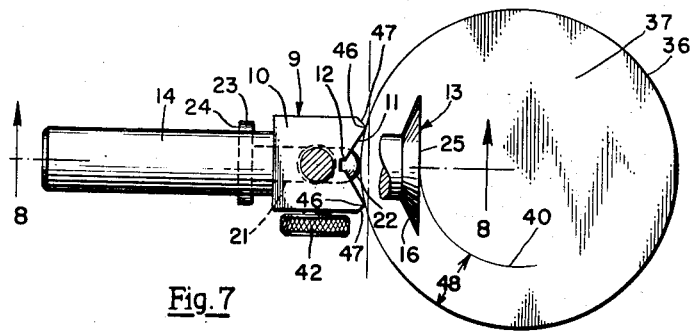
Fig. 7 is a view similar to Fig. 5, showing the instrument used for scribing a line on a circular area.

Likewise, the instrument may be utilized for scribing surfaces which are of circular area, or concavo-convex surfaces in a similar manner, as for concave surfaces used as a gauging means, illustrated in Fig. 5. In Fig. 7, a workpiece of cylindrical formation 37, having a circular base 36 is positioned so that the tip of the hemispherical portion 22 is in contact therewith, and then the scribing instrument is set to the proper position adding the constant of one inch, or whatever it may be, in order to scribe the line 40, a given dimension 48, from the outer peripheral surface 36.

Thus it can be seen that our invention comprises a universal gauge and scribing instrumentality which may be used for a long time, inasmuch as the same may be ground when the scribing edge 41 is dulled so that the same may be used continually; the standard of gauging not being affected insofar as accuracy is concerned, by virtue of the constant and accurate micrometric dimesnion between the surface 24 and the tip of the hemispherical portion 22 of the gauging element 21.

Although we have herein described rather succinctly the nature and use of our invention so that persons skilled in the art will have no difficulty apprising themselves of the teachings thereof and, inasmuch as the disclosure is susceptible of various alterations, modifications, and improvements, we hereby reserve the right to all modifications, alterations, and improvements falling within the scope and spirit of our invention, as well as any modifications that are embraced suggestively in the accompanying drawings, and any that may come within the purview of the foregoing description; our invention to be limited only by the appended claims.

Having thus disclosed and revealed our invention, what we claim as new and desire to secure by Letters Patent is:

1. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the base of the said frusto-conical scribing means and the said gauging head portion being disposed in partial overlapping relationship to afford rectilinear points of contact to a measuring instrument applied thereto.

2. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the said gauging means including a body portion terminating at one end in a hemispherical portion, the base of the said frusto-conical scribing means and the said gauging head portion being disposed in partial overlapping relationship to afford rectilinear points of contact to a measuring instrument applied thereto.

3. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the dimension of the said body from the V edges to its opposed surface being less than the entire length of the said gauging means, the base of the said frusto-conical scribing means and the said gauging head portion being disposed in partial overlapping relationship to afford rectilinear points of contact to a measuring instrument applied thereto.

4. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the said gauging means including a body portion terminating at one end in a hemispherical portion, the dimension of the said body from the V edges to its opposed surface being less than the entire length of the said gauging means, the base of the said frusto-conical scribing means and the said gauging head portion being disposed in partial overlapping relationship to afford rectilinear points of contact to a measuring instrument applied thereto.

5. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the outer edges of the said V locating means being chamfered resulting in lines adapted to assume tangential contact with flat surfaces, concave surfaces and convex surfaces without militating thereagainst, the base of the said frusto-conical scribing means and the said gauging head portion being disposed in partial overlapping relationship to afford rectilinear points of contact to a measuring instrument applied thereto.

6. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the said gauging means including a body portion terminating at one end in a hemispherical portion, the outer edges of the said V locating means being chamfered resulting in lines adapted to assume tangential contact with flat surfaces, concave surfaces and convex surfaces without militating thereagainst, the base of the said frusto-conical scribing means and the said gauging head portion being disposed in partial overlapping relationship to afford rectilinear points of contact to a measuring instrument applied thereto.

7. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the dimension of the said body from the V edges to its opposed surface being less than the entire length of the said gauging means, the outer edges of the said V locating means being chamfered resulting in lines adapted to assume tangential contact with flat surfaces, concave surfaces and convex surfaces without militating thereagainst, the base of the said frusto-conical scribing means and the said gauging head portion being disposed in partial overlapping relationship to afford rectilinear points of contact to a measuring instrument applied thereto.

8. Universal gauging and scribing means comprising a parallelepipedic body provided with V locating means on one of its faces, scriber bore means transversely related to the said V locating means, gauging bore means in parallel relationship to the said scriber bore means, scriber means having frusto-conical scribing means secured thereto, the said scriber means being slidably and adjustably secured in the said scriber bore means, gauging means secured slidably and adjustably in the said gauging bore means and provided with a gauging head portion and a reduced tip portion defining a precise gauging standard between extreme limits thereof, clamp means for securing the said scriber means in the said body, and auxiliary clamp means for securing the said gauging means in the said body in varied precise and predetermined relationships with respect to the base of the said frusto-conical scribing means, the said gauging means including a body portion terminating at one end in a hemispherical portion, the dimension of the said body from the V edges to its opposed surface being less than the entire length of the said gauging means, the outer edges of the said V locating means being chamfered resulting in lines adapted to assume tangential contact with flat surfaces, concave surfaces and convex surfaces without militating thereagainst, the base of the said frusto-conical scribing means and the said gauging head portion being disposed in partial overlapping relationship to afford rectilinear points of contact to a measuring instrument applied thereto.

ELMO F. RUBY.
WILLARD B. OWEN.

References Cited in the file of this patent

UNITED STATES PATENTS

| Number | Name | Date |
| --- | --- | --- |
| 1,262,433 | Beeck | Apr. 9, 1918 |
| 2,236,881 | Rusnak | Apr. 1, 1941 |
| 2,353,297 | Donoth | July 11, 1944 |
| 2,577,334 | Kozlowski | Dec. 4, 1951 |
| 2,587,799 | Winter | Mar. 4, 1952 |